Feb. 2, 1943. C. A. WOODWARD 2,309,741
CORD SECURING DEVICE
Filed Nov. 19, 1940
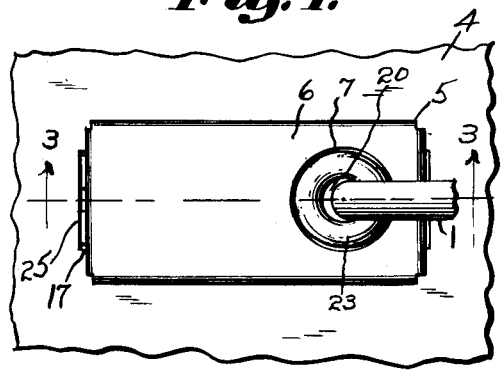
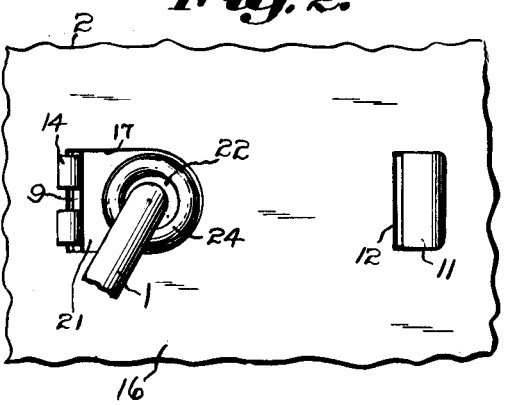
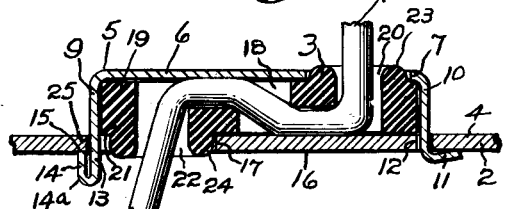
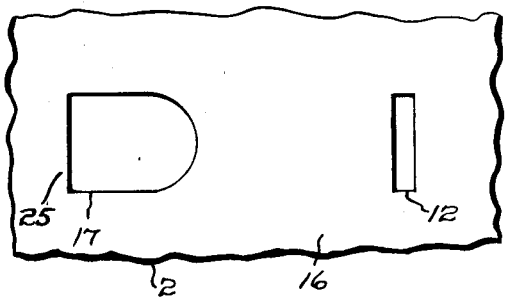
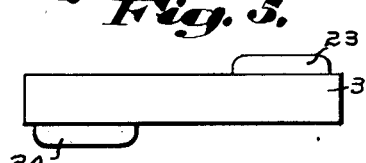
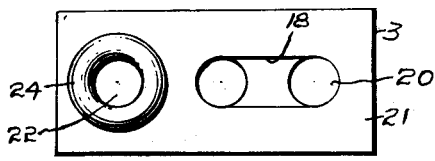
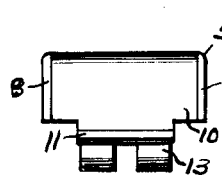
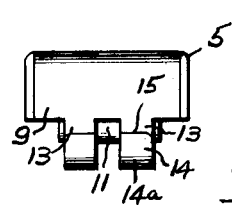
Inventor:
Clement A. Woodward,
by John Todd
Att'y.

Patented Feb. 2, 1943

2,309,741

UNITED STATES PATENT OFFICE 2,309,741

CORD SECURING DEVICE

Clement A. Woodward, Dedham, Mass., assignor to United-Carr Fastener Corporation, Cambridge, Mass., a corporation of Massachusetts Application November 19, 1940, Serial No. 366,243

3 Claims. (Cl. 173—322)

The main object of this invention is to provide a fastener device for holding a conductor in non-movable insulated relation to a metal panel through which it passes. My invention is particularly useful in connection with radio cabinets and the like as it provides cord-securing means capable of absorbing the strains which may be imposed endwisely of the cord at points along its length on either side of the cabinet. Thus, if the cord is pulled on one side of the cord-securing device, this strain will be taken up by the device thereby relieving the cord connections on the other side of the device.

Furthermore, my invention is an improvement over cord-securing devices now in commercial use in which a molded panel-engaging means is provided as an integral part of the covering insulating the conductor due to the fact that should the securing device be damaged or made useless, it is necessary only to replace the fastener device whereas with some older constructions the entire cord must be replaced.

Other objects and uses of my invention will be apparent from inspection of the drawing and specification hereinbelow set forth.

Referring to the drawing, in which I have illustrated a preferred embodiment of my invention:

Fig. 1 is a top plan view of an installation embodying my invention showing a power cord secured in fixed relation to a metal panel through which it passes;

Fig. 2 is a bottom plan view of the installation shown in Fig. 1;

Fig. 3 is a section taken along the line 3—3 of Fig. 1;

Fig. 4 is a view showing the metal panel prior to attachment of the cord-securing device thereto;

Fig. 5 is a side elevation of an insulating block forming a part of the cord-securing device;

Fig. 6 is a bottom view of the insulating block shown in Fig. 5;

Fig. 7 is a bottom plan view of the retainer member of the cord-securing device;

Fig. 8 is an end view of the retainer member looking from the right of Fig. 7; and Fig. 9 is an end view of the retainer member looking from the left of Fig. 7.

Referring to my preferred installation shown in Figs. 1–3. I have shown a conductor such as a power cord 1 passing through a panel 2, which may be the metal cabinet of a radio set, and secured to the panel through means of a cord-securing device comprising an insulating block 3 which is detachably secured to the outer surface 4 of the panel by means of a metal retainer member 5. The insulating block 3 is constructed in a way to receive the cord 1 in conjunction with the member 5 and secure the cord against endwise movement when it is subjected to strains imposed on either side of the panel 2.

Referring in detail to the specific construction of the parts of the cord-securing device, the retainer member 5 is preferably made of one piece of sheet metal folded in the form of a rectangular box having a bottom 6 and an open side opposed to the bottom 6. The bottom wall 6, in my preferred form, has an opening 7 adapted to receive a portion of the insulating block 3, as most clearly shown in Fig. 3. The box has opposed side walls 8—8 and opposed end walls 9 and 10 preferably formed by folding portions of a flat blank of predetermined shape into perpendicular relation to the bottom 6. As a result of this construction the end wall 9 is yieldable forward and back for a purpose to be described. As a means for securing the retainer member in detachable assembly with the panel 2, I have provided attaching portions integral with the free edges of the end walls 9 and 10 and extending downwardly from the retainer member, viewing Fig. 3. The attaching portions, in my preferred form, include a hook-shaped portion 11 adapted for hooking engagement with the panel 2 through a rectangular opening 12 thereof (Figs. 3 and 4) and a pair of straight leg portions 13—13 integral with the end wall 9 and yieldable with the end wall. The legs 13 have reversely bent end portions 14 which provide a radius or cam 14ª (Fig. 3) on their outer surface. The outermost free ends 15 of the portions 14 substantially face the bottom wall 6 so as to form shoulders for engaging behind the inner surface 16 of the panel 2. The legs 13—13 are moved into engagement with the panel 2 through an opening 17 thereof with the opening 17 preferably formed large enough to receive also a portion of the insulating block 3, as most clearly shown in Fig. 3.

The insulating block 3 is preferably in the form of a rectangular body made of any suitable insulating material. The block has a continuous winding cord-receiving passage 18 which has one end opening on the upper side 19 of the block as at 20 (Fig. 3) and its other end opening on the lower side 21 as at 22. The cord 1 is readily laced through the winding passage 18 so as to be secured against endwise movement. The insulating block preferably has an annular projection 23 on its upper side 19 surrounding the opening 20 and an annular projection 24 on its lower side 21 surrounding the opening 22.

Assembly of the parts of the installation is a simple matter and is carried out by first entering the cord into the opening 20 of the block 3 and then lacing it through the winding passage 18 so that it extends through the opening 22. Next the insulating block 3 is disposed within the retainer member 5. This is accomplished by moving the insulating block toward the retainer member to move one end of the cord 1 through the opening 7 of the portion 6. Then the block is moved into the retainer member through its open side so that the annular ring 23 projects through the opening 7 of the bottom 6 of the retainer member thereby preventing the cord 1 from coming into contact with the metal of the retainer member. The relative dimensions of the block and retainer member may be such that the block is held in temporary assembly within the retainer member by frictional engagement of the retainer member walls upon the same. The parts of the cord-securing device are now in temporary assembly and the device is attached to the panel 2 by first moving the securing device toward the panel to project the cord 1 through the opening 17 of the panel. Next, the hook portion 11 is moved through the opening 12 of the panel. After this action the attaching portions 13—13 are pressed in the direction of the panel to engage the cam portions 14a with the outer surface 4 of the panel adjacent a wall 25 (Fig. 3) of the opening 17. As pressure upon the securing device in the direction of the panel is continued, the end wall 9 is cammed inwardly allowing the return bends 14 of the attaching portions to pass through the aperture 17, after which the end wall springs back toward its normal position so as to engage the shoulders 15 behind the surface 16 of the panel. The device is now in final applied position and the annular projection 24 extends into the opening 17 of the panel to aid in preventing the cord from touching the panel. Thus the cord-securing device is fixed to the panel against normal strains, vibrations and the like, but the device may be quickly detached from the panel by reverse operation to that hereinabove described so as to permit the cord to be removed for replacement or repair.

The cord-securing device hereinabove described is simple and inexpensive to manufacture and efficient in operation. It is capable of ready engagement and disengagement with a supporting panel and, at the same time, it is capable of operation upon a cord to absorb the strains to which the cord may be subjected. In case of damage to the securing device, the parts of the device may be easily detached from the panel and taken apart to permit substitution of a new insulating block and retainer member.

Although I have illustrated and described a preferred embodiment of my invention, I do not wish to be limited thereby because the scope of my invention is best defined in the following claims.

I claim:

1. In combination, a supporting panel formed with spaced openings providing boss-receiving and fastener-receiving openings, an elongated strain-relieving block in engagement with one face of said panel and formed with an apertured boss extending into the boss-receiving opening of said panel, an apertured boss on the opposite face of the block spaced laterally from and out of alignment with the first named boss, said block having a cord-receiving passage connecting said apertured bosses, a retainer casing fitted over said block and having an opening receiving said second-named boss, and fastener means on said casing for engagement with the fastener-receiving openings of said panel for clamping the block to the panel against shifting or turning movement relative thereto.

2. In combination, a supporting panel, formed with spaced openings providing boss-receiving and fastener-receiving openings, an elongated strain-relieving block in engagement with one face of said panel and formed with an apertured boss extending into the boss-receiving opening of said panel, an apertured boss on the opposite face of the block spaced laterally from and out of alignment with the first-named boss, said block having a cord-receiving passage connecting said apertured bosses, a retainer casing fitted over said block and having an opening receiving said second-named boss, a lateral hooked extension on one end of said casing insertable through one of said fastener-receiving openings, and snap fastener means on a part of said casing, remote from said extension for snap fastener engagement through another opening in said panel for securing said strain-relieving block securely thereto.

3. In combination, a supporting panel formed with spaced openings providing boss-receiving and fastener-receiving openings, an elongated strain-relieving block in engagement with one face of said panel and formed with an apertured boss extending into the boss-receiving opening of said panel, an apertured boss on the opposite face of the block spaced laterally from and out of alignment with the first-named boss, said block having a cord-receiving passage connecting said apertured bosses, a cup-shaped rectangular retainer casing fitted over said block and having an opening receiving said second-named boss, a lateral hooked extension on one end of said casing insertable through one of said fastener receiving openings, and snap fastener means on a part of said casing, remote from said extension for snap fastener engagement through another opening in said panel for securing said strain-relieving block securely thereto.

CLEMENT A. WOODWARD.